(12) United States Patent
Nuttgens

(10) Patent No.: US 8,548,336 B2
(45) Date of Patent: Oct. 1, 2013

(54) CLOSED LOOP OPTICAL MODULATION AMPLITUDE CONTROL

(75) Inventor: Jonah Nuttgens, Southampton (GB)

(73) Assignee: Semtech Corporation, Camarillo, CA (US)

( * ) Notice: Subject to any disclaimer, the term of this patent is extended or adjusted under 35 U.S.C. 154(b) by 97 days.

(21) Appl. No.: 13/309,951

(22) Filed: Dec. 2, 2011

(65) Prior Publication Data

US 2013/0142506 A1 Jun. 6, 2013

(51) Int. Cl.
*H04B 10/564* (2013.01)
*H01S 5/0683* (2006.01)

(52) U.S. Cl.
USPC .............................. 398/197; 398/195; 372/31

(58) Field of Classification Search
USPC .................... 398/198, 195, 182, 197; 372/31
See application file for complete search history.

(56) References Cited

U.S. PATENT DOCUMENTS

| | | | | |
|---|---|---|---|---|
| 4,733,398 A | * | 3/1988 | Shibagaki et al. | 372/31 |
| 4,813,048 A | * | 3/1989 | Yamane et al. | 372/38.07 |
| 4,856,011 A | * | 8/1989 | Shimada et al. | 372/29.01 |
| 5,373,387 A | | 12/1994 | Bosch et al. | |
| 5,548,435 A | * | 8/1996 | Tahara et al. | 398/195 |
| 5,675,600 A | * | 10/1997 | Yamamoto et al. | 372/38.01 |
| 6,192,060 B1 | * | 2/2001 | Kobayashi | 372/38.01 |
| 6,795,656 B1 | * | 9/2004 | Ikeuchi et al. | 398/197 |
| 8,086,111 B2 | * | 12/2011 | Miller | 398/195 |
| 2003/0218585 A1 | | 11/2003 | Hoshi et al. | |
| 2004/0052281 A1 | * | 3/2004 | Hamajima et al. | 372/38.01 |
| 2005/0238072 A1 | * | 10/2005 | Uesaka | 372/38.02 |
| 2008/0219678 A1 | * | 9/2008 | Doi | 398/198 |
| 2009/0232517 A1 | | 9/2009 | Farina et al. | |

FOREIGN PATENT DOCUMENTS

| | | |
|---|---|---|
| CA | 1229653 A1 | 11/1987 |
| EP | 0649201 A1 | 4/1995 |

OTHER PUBLICATIONS

PCT/GB2012/000878 filed Nov. 30, 2012, International Search Report and Written Opinion dated Mar. 27, 2013.

* cited by examiner

*Primary Examiner* — Kenneth N Vanderpuye
*Assistant Examiner* — Dibson Sanchez
(74) *Attorney, Agent, or Firm* — Jones Day

(57) ABSTRACT

Systems and methods are provided for an optical modulation feedback circuit. The feedback circuit includes a low frequency comparison circuit configured to receive a monitoring signal generated by an optical detector, the monitoring signal being proportional to an amount of light generated by an optical transmission device that transmits based on a data signal that is received by an optical driver. The comparison circuit is further configured to generate a modulation control feedback signal that is transmitted to the optical driver based on a comparison of a low frequency component of the monitoring signal and a low frequency component of the data signal.

13 Claims, 19 Drawing Sheets

US 8,548,336 B2

CLOSED LOOP OPTICAL MODULATION AMPLITUDE CONTROL

FIELD

The technology described herein relates generally to data transmission and more particularly to optical data transmitter control.

BACKGROUND

Optic communication involves the transmission of information from one place to another by sending pulses of light, such as through an optical fiber. The light forms a carrier wave that is modulated to carry information. Optic communications are known for their low loss nature and high data-carrying capacity. However, these perceived advantages of an optical communication system can be mitigated when the quality of optical data signal generation is not adequately controlled.

SUMMARY

In accordance with the teachings herein, systems and methods are provided for an optical modulation feedback circuit. The feedback circuit includes a low frequency comparison circuit configured to receive a monitoring signal generated by an optical detector, the monitoring signal being proportional to an amount of light generated by an optical transmission device that transmits based on a data signal that is received by an optical driver. The comparison circuit is further configured to generate a modulation control feedback signal that is transmitted to the optical driver based on a comparison of a low frequency component of the monitoring signal and a low frequency component of the data signal.

As another example, in a method of performing optical modulation amplitude feedback control, a monitoring signal is received from an optical detector that is proportional to an amount of light generated by an optical transmission device that transmits based on a data signal that received by an optical driver, and a modulation control feedback signal is generated that is transmitted to the optical driver based on a comparison of a low frequency component of the monitoring signal and a low frequency component of the data signal.

As a further example, an optical driver integrated circuit includes an optical driver configured to output a driver signal based on a received data signal, where a modulation amplitude of the driver signal is controlled according to a received modulation control feedback signal. The integrated circuit further includes a low frequency comparison circuit configured to receive a monitoring signal generated by an optical detector, the monitoring signal being proportional to an amount of light generated by an optical transmission device that transmits based on the driver signal. The comparison circuit is further configured generate the modulation control feedback signal that is transmitted to the optical driver based on a comparison of a low frequency component of the monitoring signal and a low frequency component of the data signal.

As an additional example, an optical module includes an optical driver configured to output a driver signal based on a received data signal, where a modulation amplitude of the driver signal is controlled according to a received modulation control feedback signal, and a laser diode configured to transmit light based on the driver signal. The driver further includes an optical detector configured to generate a monitoring signal that is proportional to an amount of light generated by the optical transmission device and a low frequency comparison circuit configured to generate the modulation control feedback signal that is transmitted to the optical driver based on a comparison of a low frequency component of the monitoring signal and a low frequency component of the data signal.

DETAILED DESCRIPTION

An optical transmitter, such as, a light-emitting diode (LED) transmitter, a VCSEL transmitter, or a laser diode transmitter, includes components for generating light that is modulated to carry information. For example, a laser diode transmitter includes a laser diode and a laser diode driver that generates a driver signal that is transmitted to the laser diode to generate the data carrying light signal.

The laser diode driver receives one or more input signals that are processed to generate the driver signal. For example, a laser diode driver may receive a data input signal that contains data that is to be modulated into the light signal for transmission as well as one or more parameter adjustment inputs, such as a modulation current control input and a bias current control input. A modulation current control input controls the absolute difference in optical power output between a logic "1" and a logic "0," and a bias current control input controls an average optical power output of the laser diode. Because performance of an optical transmitter may vary based on a number of factors such as changes in temperature, variation in transmitter characteristics over time, etc., control mechanisms can be incorporated into an optical transmitter configuration to ensure that the optical transmitter functions in a desired operating range so as to maintain a high signal quality and minimize power dissipation.

Figure 1:
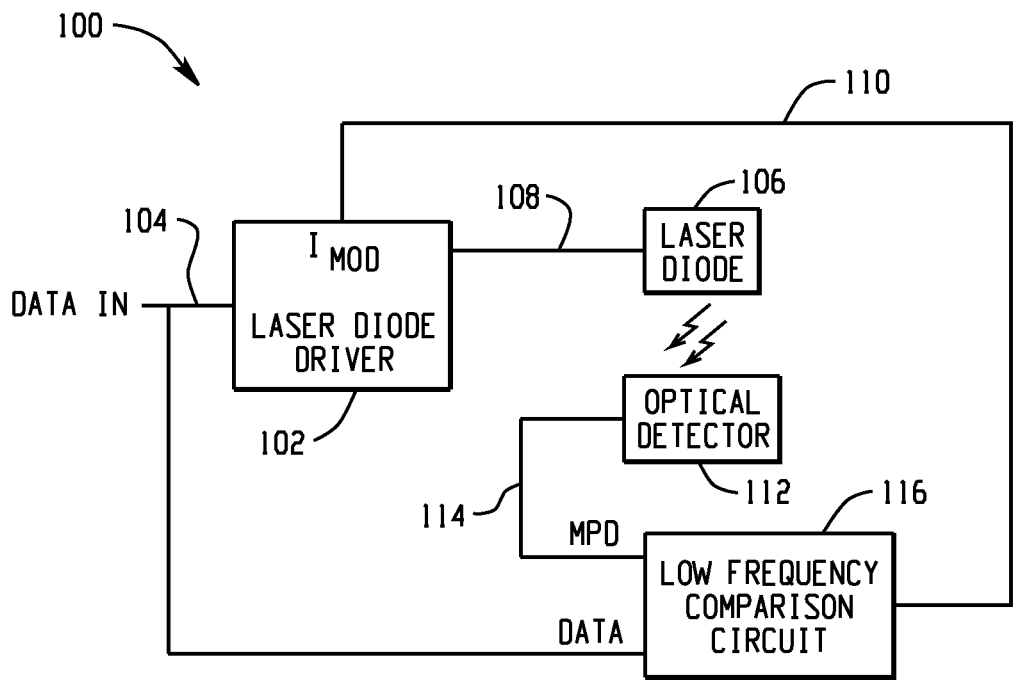
FIG. 1 is a block diagram depicting an optical transmitter configuration that includes closed loop optical modulation amplitude control.

FIG. 1 is a block diagram depicting an optical transmitter configuration that includes closed loop optical modulation amplitude (OMA) control. A laser diode driver 102 receives a data input signal 104 that supplies data that is to be modulated onto a light signal by a laser diode 106 according to a driver signal 108 transmitted by the laser diode driver 102. The laser diode driver 102 also receives an OMA control feedback signal ($I_{MOD}$) 110 that regulates the absolute difference in optical power output of the laser diode 106 between a logic "1" and a logic "0." The modulation control feedback signal 110 is generated via closed loop monitoring control. An optical detector, such as a monitor photo diode 112, detects an amount of light generated by the laser diode 106 and outputs a monitoring signal 114 that is proportional to the amount of light detected. A low frequency comparison circuit 116 receives the monitoring signal 114 and the data signal 104. The low frequency comparison compares a low frequency component of the monitoring signal 114 and a low frequency component of the data signal 104 to generate the modulation control feedback signal 110 that is transmitted to the laser diode driver 102 to regulate the optical modulation amplitude.

Figure 2:
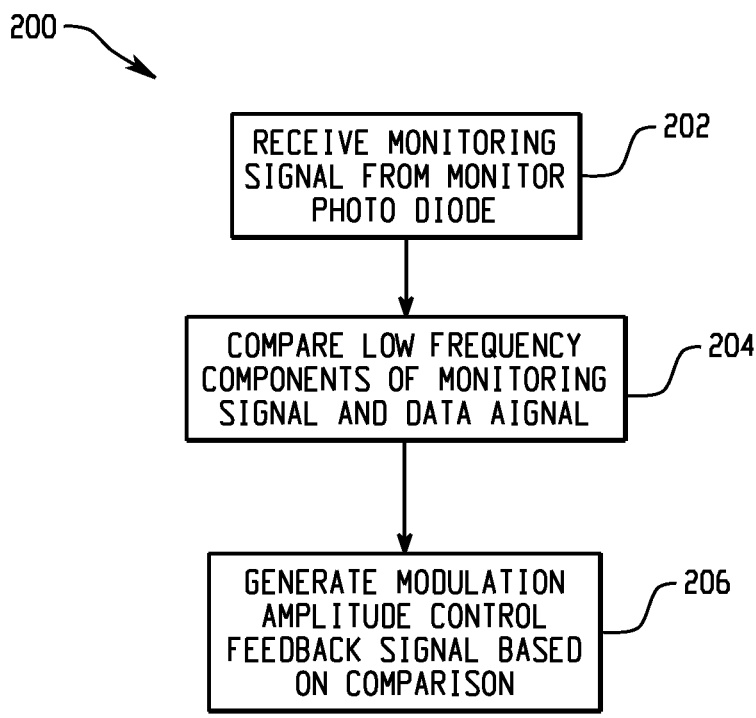
FIG. 2 is a flow diagram depicting a method of performing optical modulation amplitude feedback control.

FIG. 2 is a flow diagram depicting a method of performing optical modulation amplitude feedback control. At 202, a monitoring signal is received from an optical detector that is proportional to an amount of light generated by an optical transmission device that transmits based on a data signal received by an optical driver. At 204, a comparison is made between a low frequency component of the monitoring signal and a low frequency component of the data signal, and at 206, a modulation control feedback signal is generated and transmitted to the optical driver based on the comparison.

Figure 3:
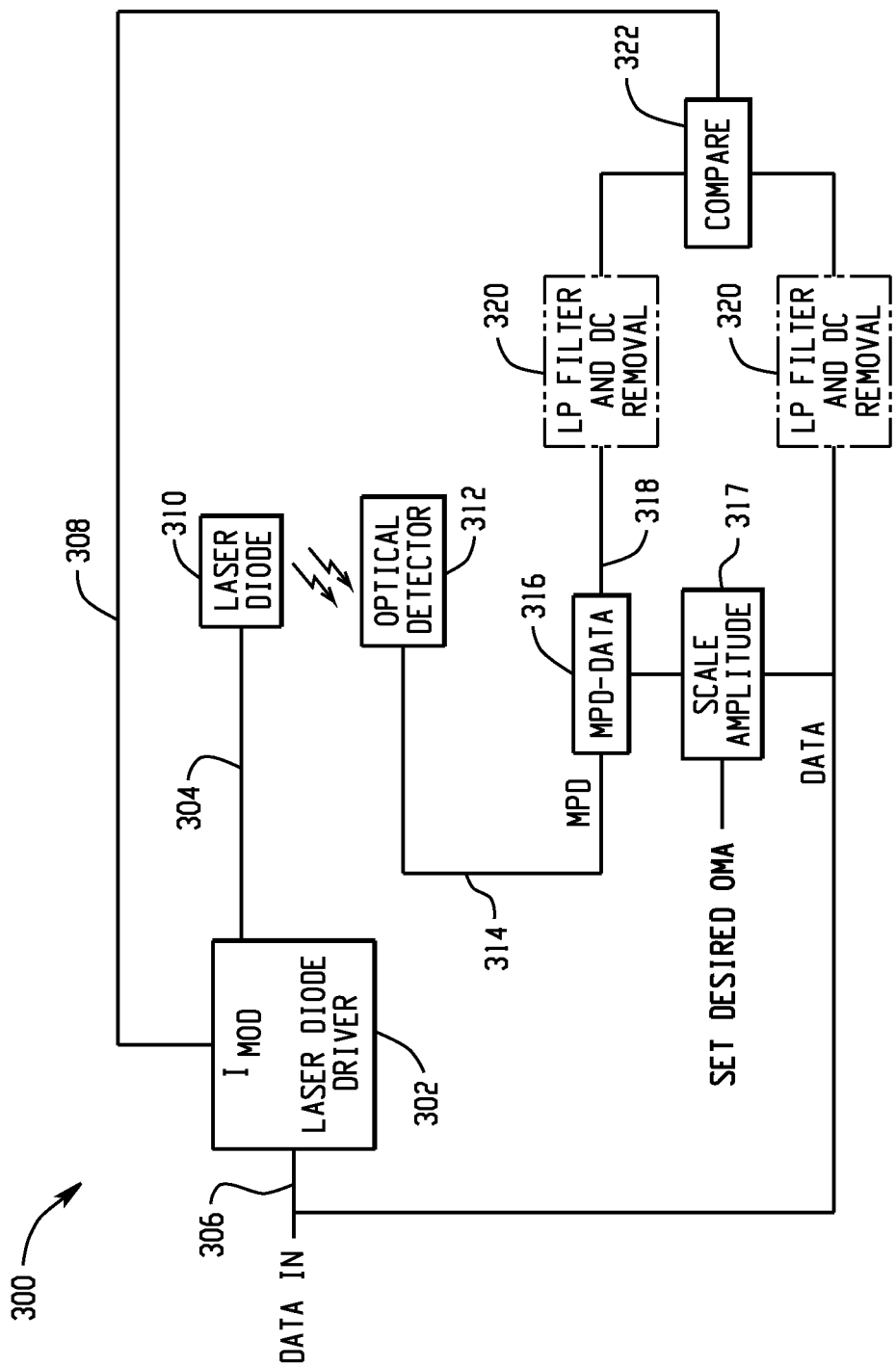
FIG. 3 is a block diagram depicting an optical modulation feedback circuit that filters one or both of a monitoring signal and a data signal.

FIG. 3 is a block diagram depicting an optical modulation feedback circuit that filters one or both of a monitoring signal and a data signal. A laser diode driver 302 generates a driver signal 304 based on a data input signal 306 and an optical modulation amplitude current feedback signal 308. The driver signal 304 is transmitted to a laser diode 310 for data transmission. A monitor photo diode 312 acts as an optical detector that generates a monitor signal 314 that is proportional to an amount of light generated by the laser diode 310. The monitor signal 314 and the data signal 306 are transmitted to a subtractor 316 that subtracts a value proportional to the data signal (e.g., via amplitude scaler 317) from the monitor signal 314 that is proportional to the light transmitted by the laser diode 310 to generate a residue signal 318. If the OMA of the transmitter is on target, then the residue signal 318 will be close to zero. If the OMA is greater than the target, then the residue signal will be in phase with the digital signal, and if the OMA is less than the target, then the residue signal will be out of phase with the data signal.

At 320, one or both of the residue signal 318 and the data signal 306 are filtered to remove high frequency components of the signal and AC-coupled to remove the DC component of the signal. For example, the signals 306, 318 may be transmitted to a low pass filter 320 that filters signal components having a frequency approaching or greater than the bandwidth of the monitor photo diode 312, which are sometimes band-limited devices having a maximum bandwidth of $\omega_{MAX}$. In such a configuration, the low pass filter(s) 320 may be configured to filter out high frequency components approaching or greater than $\omega_{MAX}$. At 322, the low frequency components are compared to generate the modulation control feedback signal 308 that is transmitted to the laser diode driver 302. For example, the filtered residue signal 318 and data signal 306 may be compared by multiplying (mixing) or correlating the two signals 306, 318 to generate the modulation control feedback signal 308.

Figure 4:
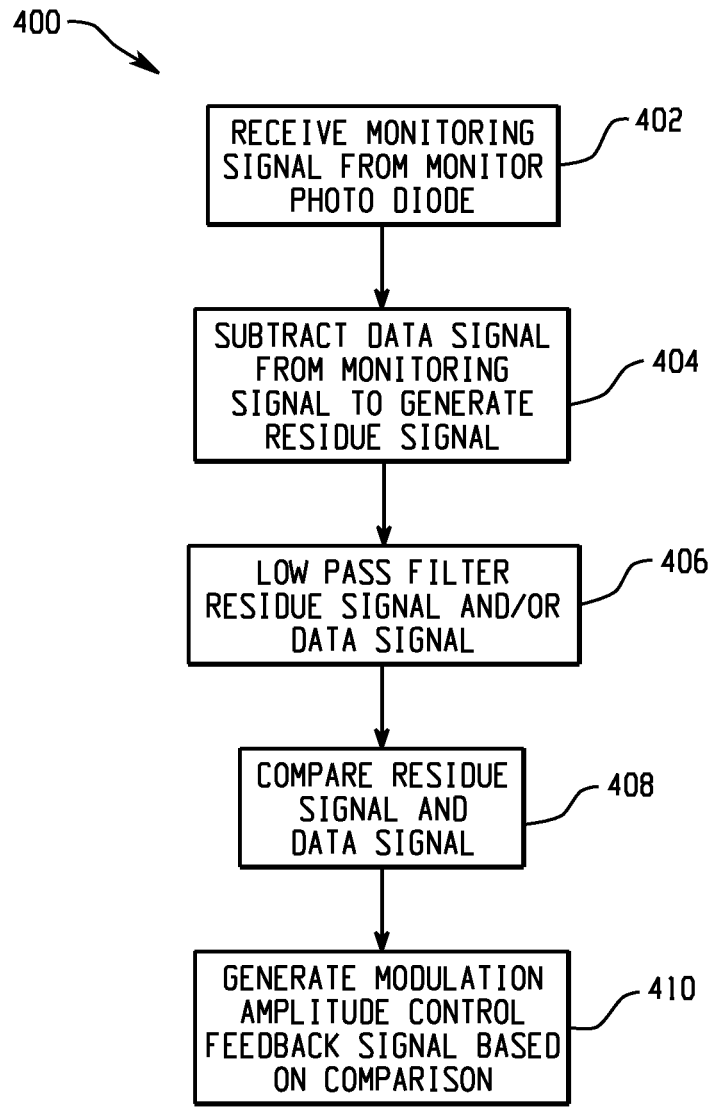
FIG. 4 is a flow diagram depicting a method of performing optical modulation amplitude feedback control.

FIG. 4 is a flow diagram depicting a method of performing optical modulation amplitude feedback control. At 402, a monitoring signal is received from an optical detector, such as a monitor photo diode, that is proportional to an amount of light generated by an optical transmission device that transmits based on a data signal received by an optical driver. At 404, a signal proportional to the data signal is subtracted from the monitoring signal to generate a residue signal, and at 406, one or both of the residue signal and the data signal are transmitted to a low pass filter. At 408, a comparison is made between the low frequency component of the monitoring signal and the low frequency component of the data signal. For example, the comparison may be performed by multiplying or correlating the residue signal and the data signal. At 410, a modulation control feedback signal is generated that is transmitted to the optical driver and is based on the comparison at 408.

Figure 5A:
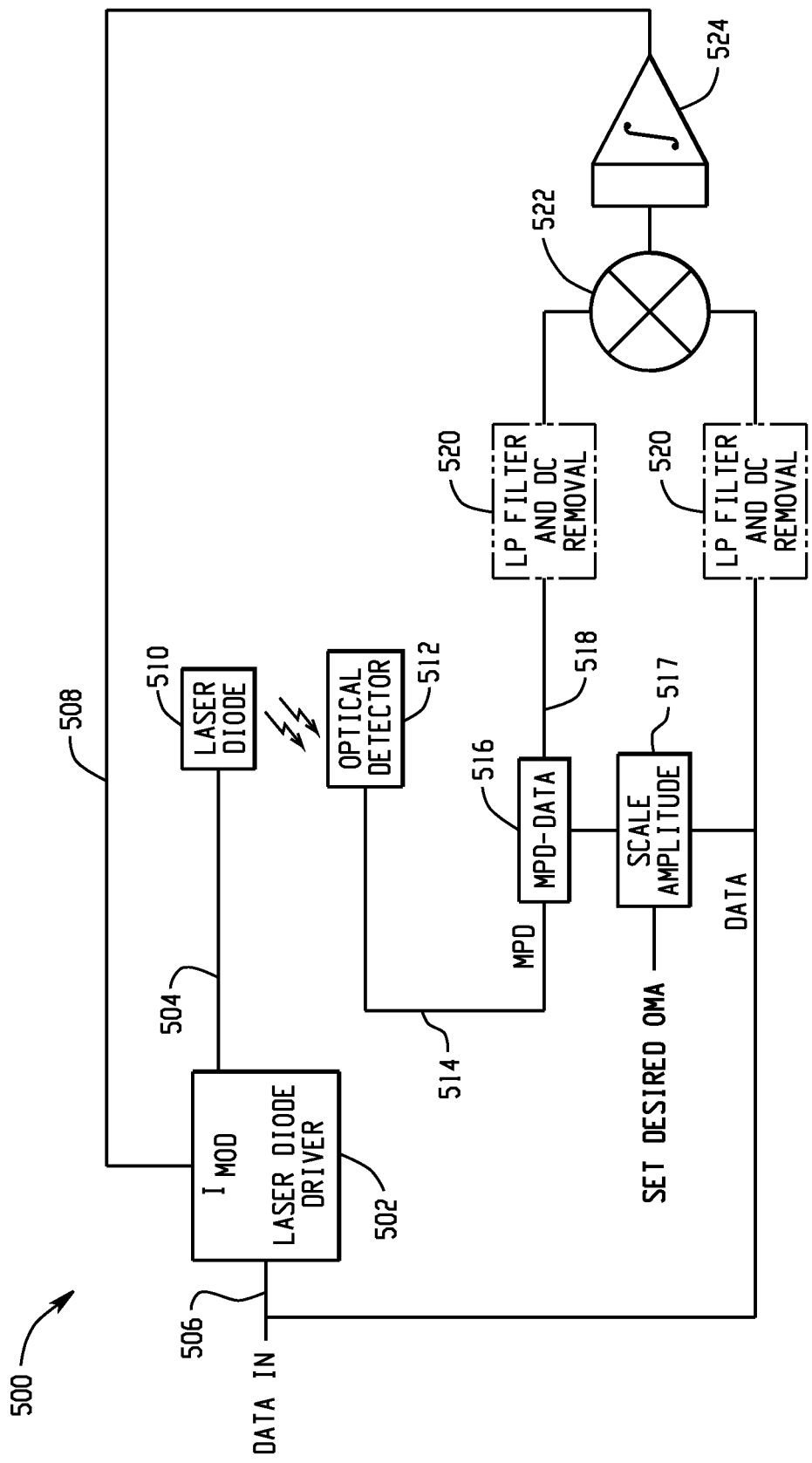
FIGS. 5A and 5B are block diagrams of an optical modulation feedback circuit depicting example details of a comparison between a monitor signal and a data signal.
Figure 5B:
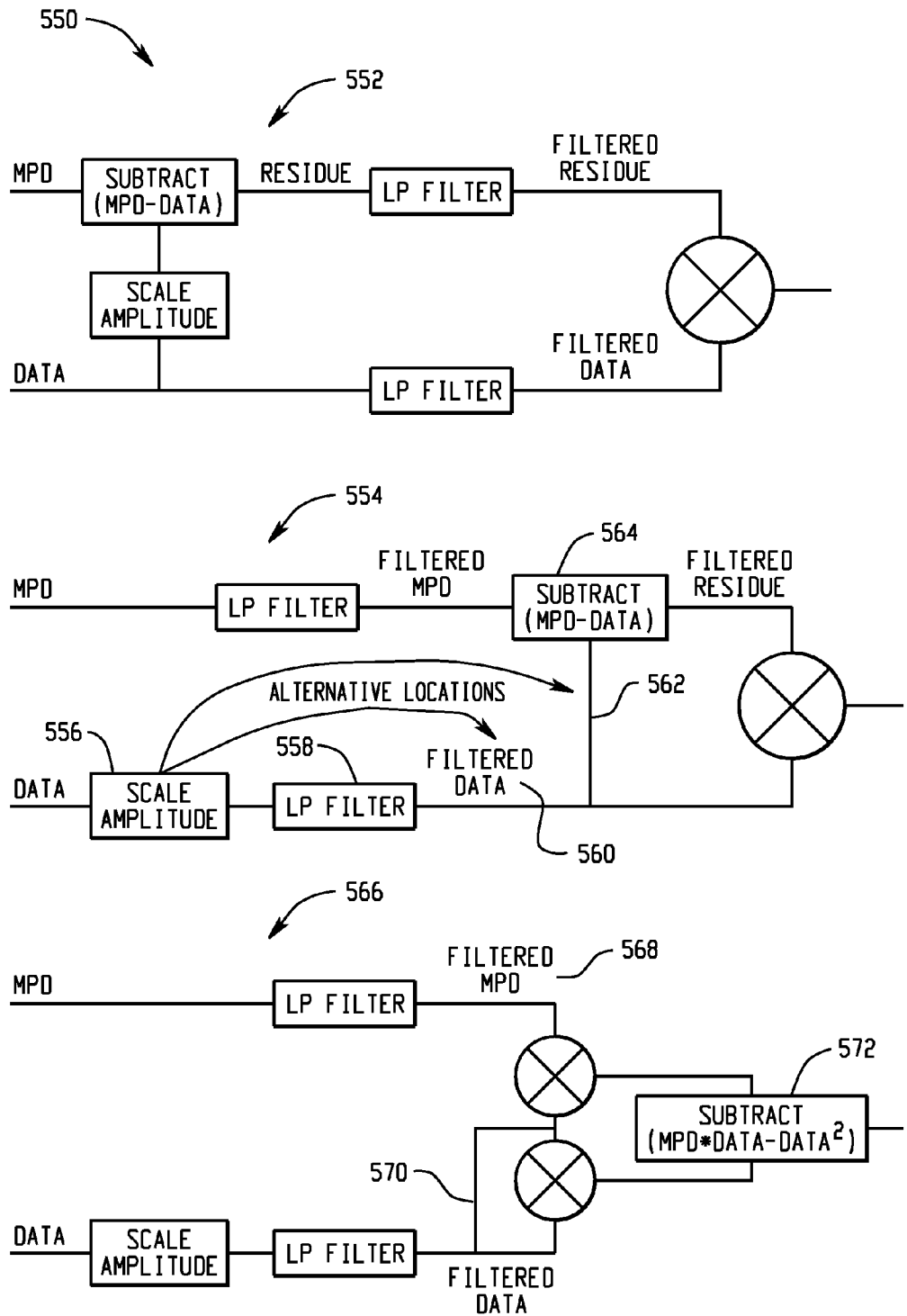

FIGS. 5A and 5B are block diagrams of an optical modulation feedback circuit depicting example details of a comparison between a monitor signal and a data signal. In FIG. 5A, a laser diode driver 502 generates a driver signal 504 based on a data input signal 506 and an optical modulation amplitude current feedback signal 508. The driver signal 504 is transmitted to a laser diode 510 for data transmission. A monitor photo diode 512 acts as an optical detector that generates a monitor signal 514 that is proportional to an amount of light generated by the laser diode 510. The monitor signal 514 and the data signal 506 are transmitted to a subtractor 516 that subtracts a value proportional to the data signal 506 from the monitor signal 514 that is proportional to the light transmitted by the laser diode 510 to generate a residue signal 518.

At 520, one or both of the residue signal 518 and the data signal 506 are filtered to remove high frequency components of the signal and may be AC-coupled to remove the DC component of the signal. At 522, the low frequency components are compared. For example, the filtered residue signal 518 and data signal 506 may be compared by multiplying the two signals 506, 518. The output of the multiplying 522 is transmitted to an integrator 524 to generate the modulation control feedback signal 508.

FIG. 5B depicts alternate configurations for providing the comparison between a monitor signal and a data signal in FIG. 5A. The alternate configurations may provide similar or equivalent performance as each other alternate configuration. The comparison configuration of FIG. 5A is shown at 552. At 554, scaling of the data signal is moved to one of: before 556 the low pass filtering 558 of the data signal, after 560 the low pass filtering 558 of the data signal but before the branch 562 to the subtractor 564, and on the branch 562 to the subtractor 564. At 566, a filtered form of the monitor signal 568 and a scaled and filtered form of the data signal are mixed and then provided to a subtractor 572.

Figure 6:
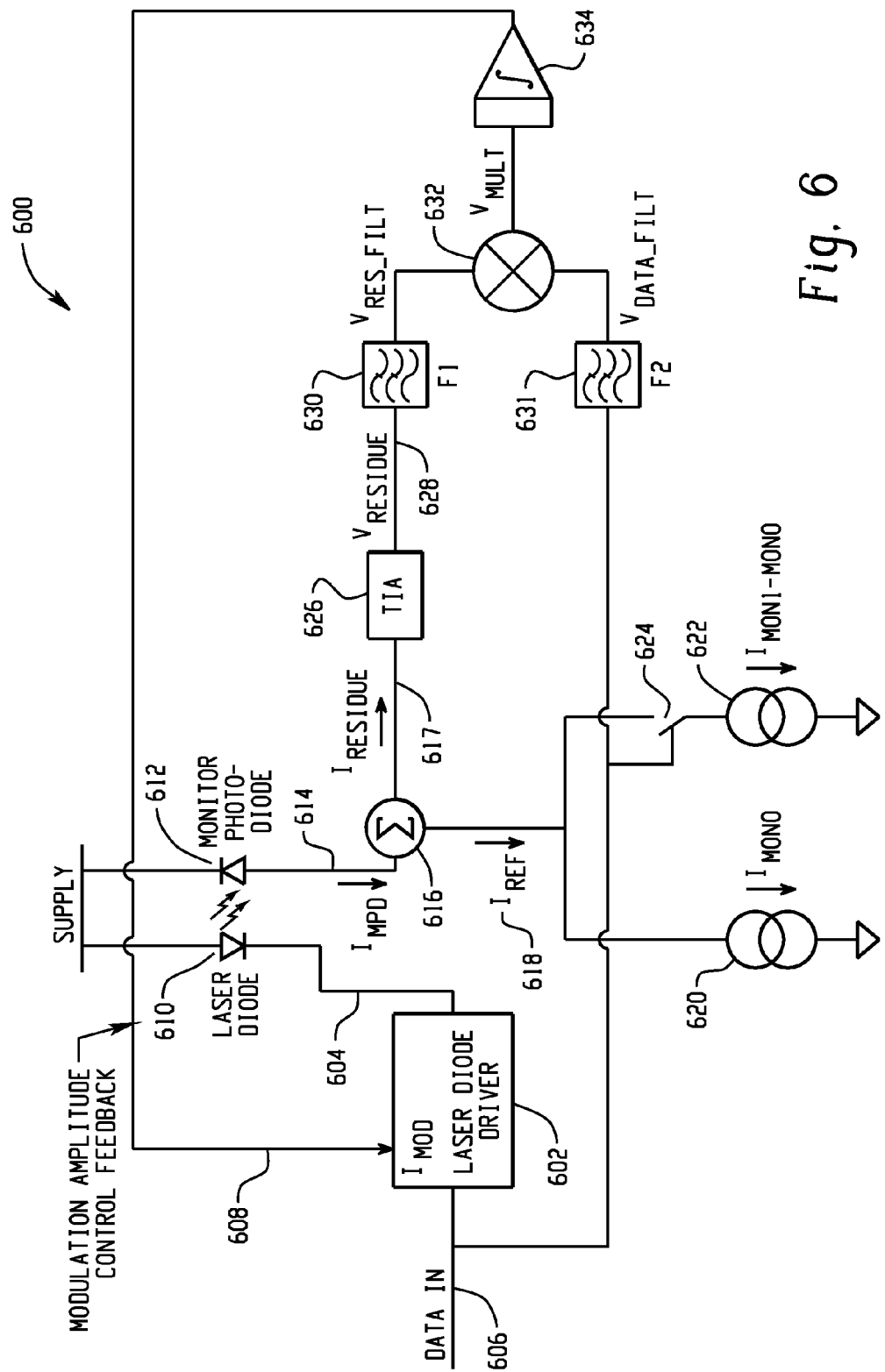
FIG. 6 is a block diagram of an optical modulation feedback circuit depicting example details of a subtractor circuit.
Figure 7A:
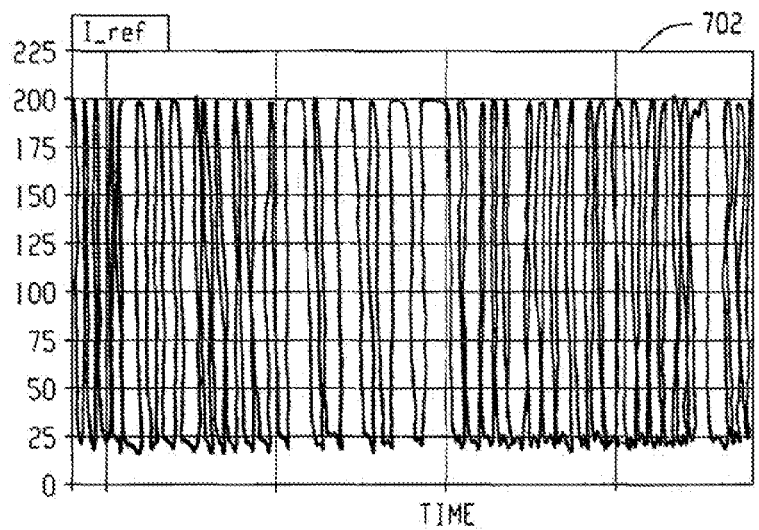
FIGS. 7 and 8 depict a number of plots of example data signals at particular points in the configuration of FIG. 6.
Figure 7B:
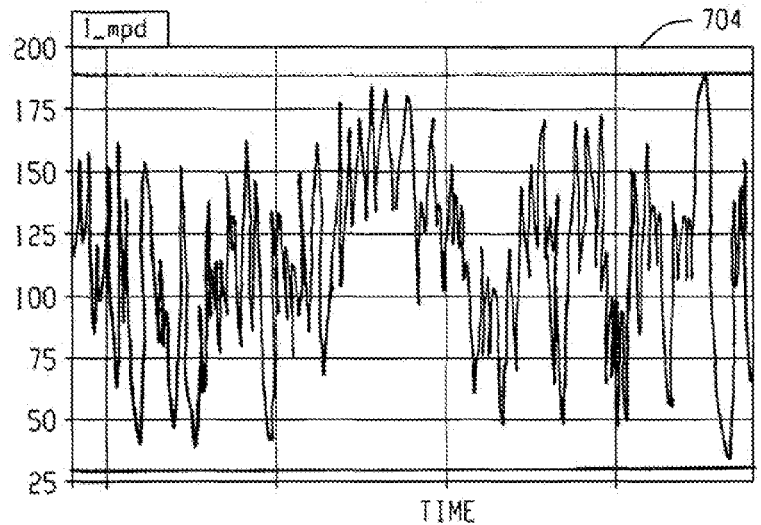
Figure 7C:
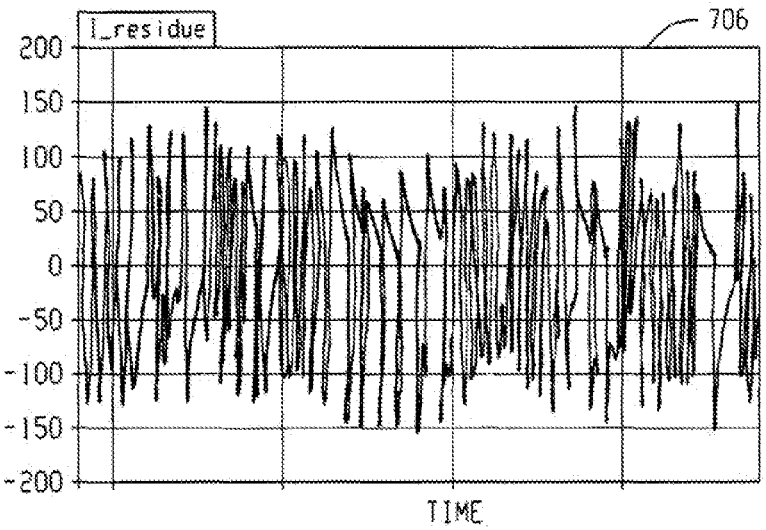
Figure 7D:
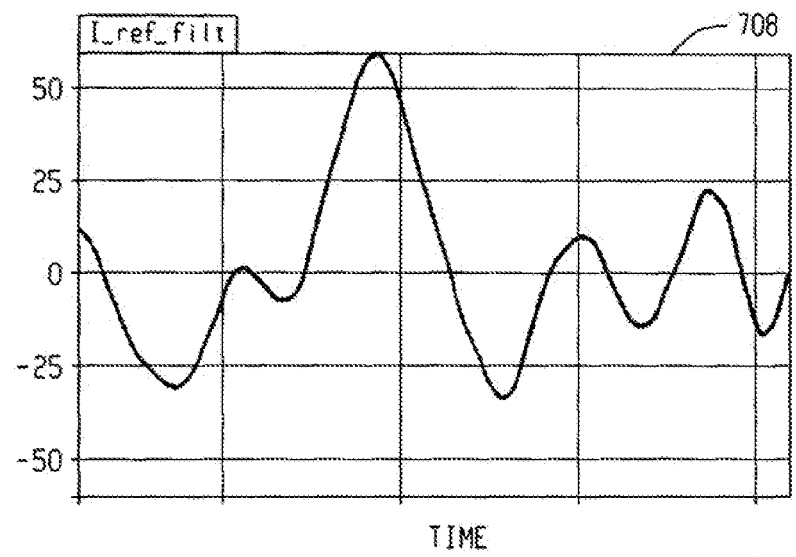
Figure 7E:
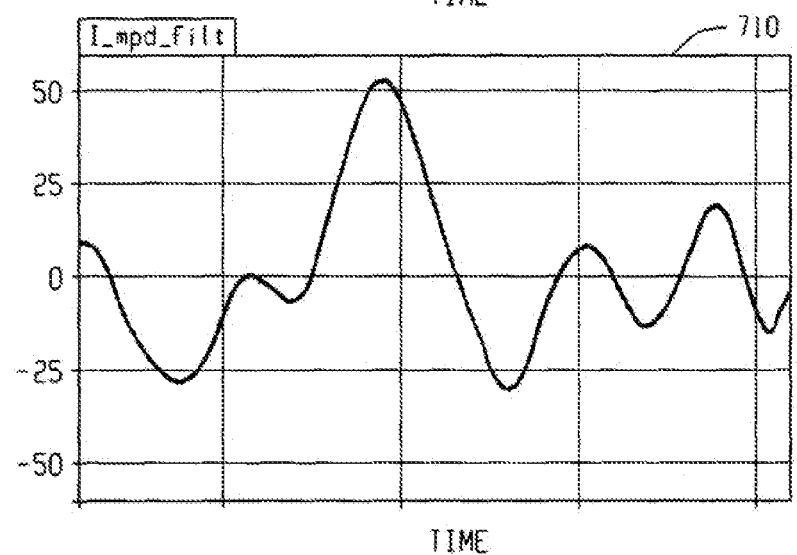
Figure 7F:
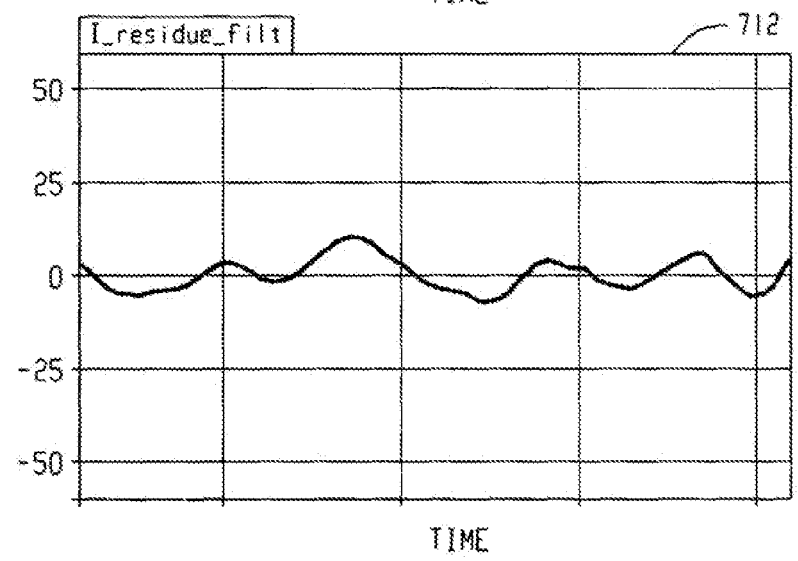
Figure 7G:
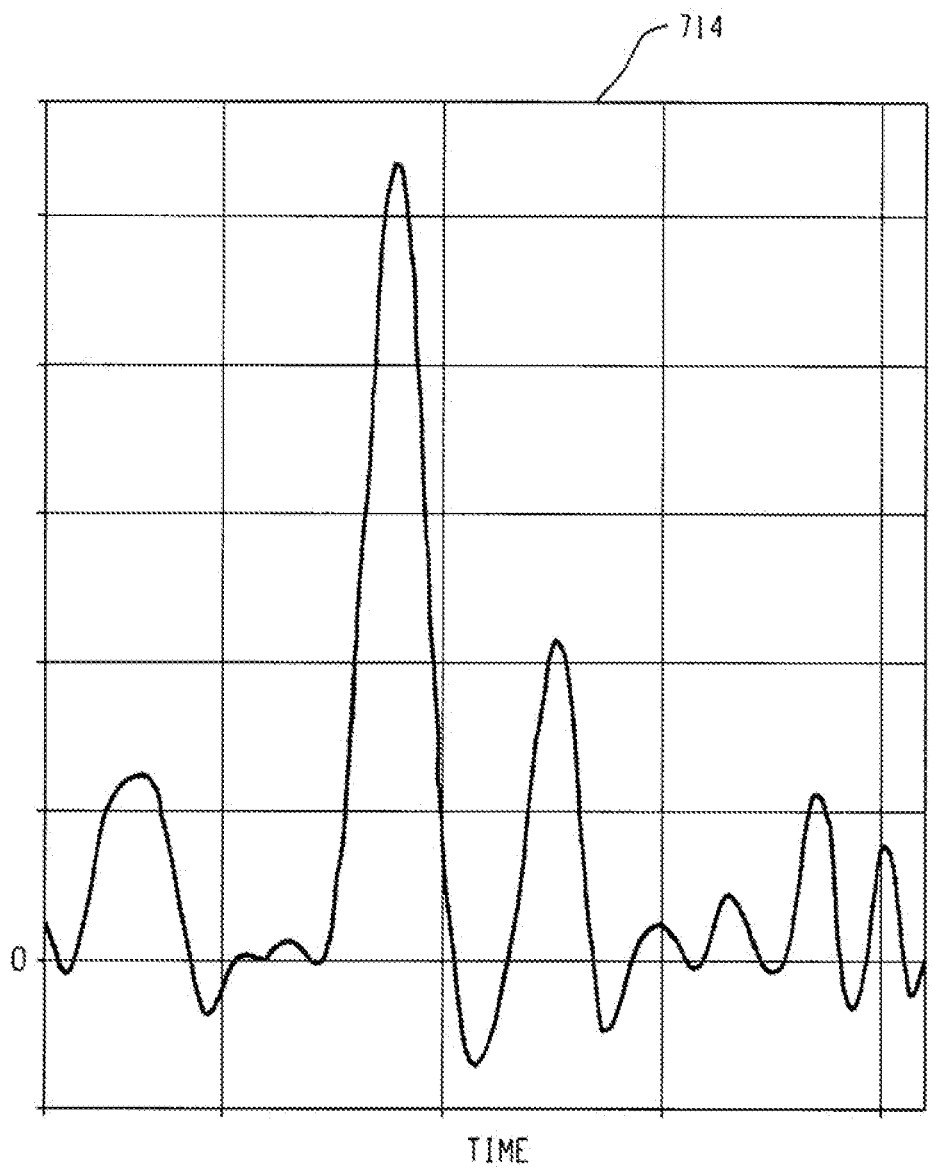
Figures 8A, 8B, 8C:
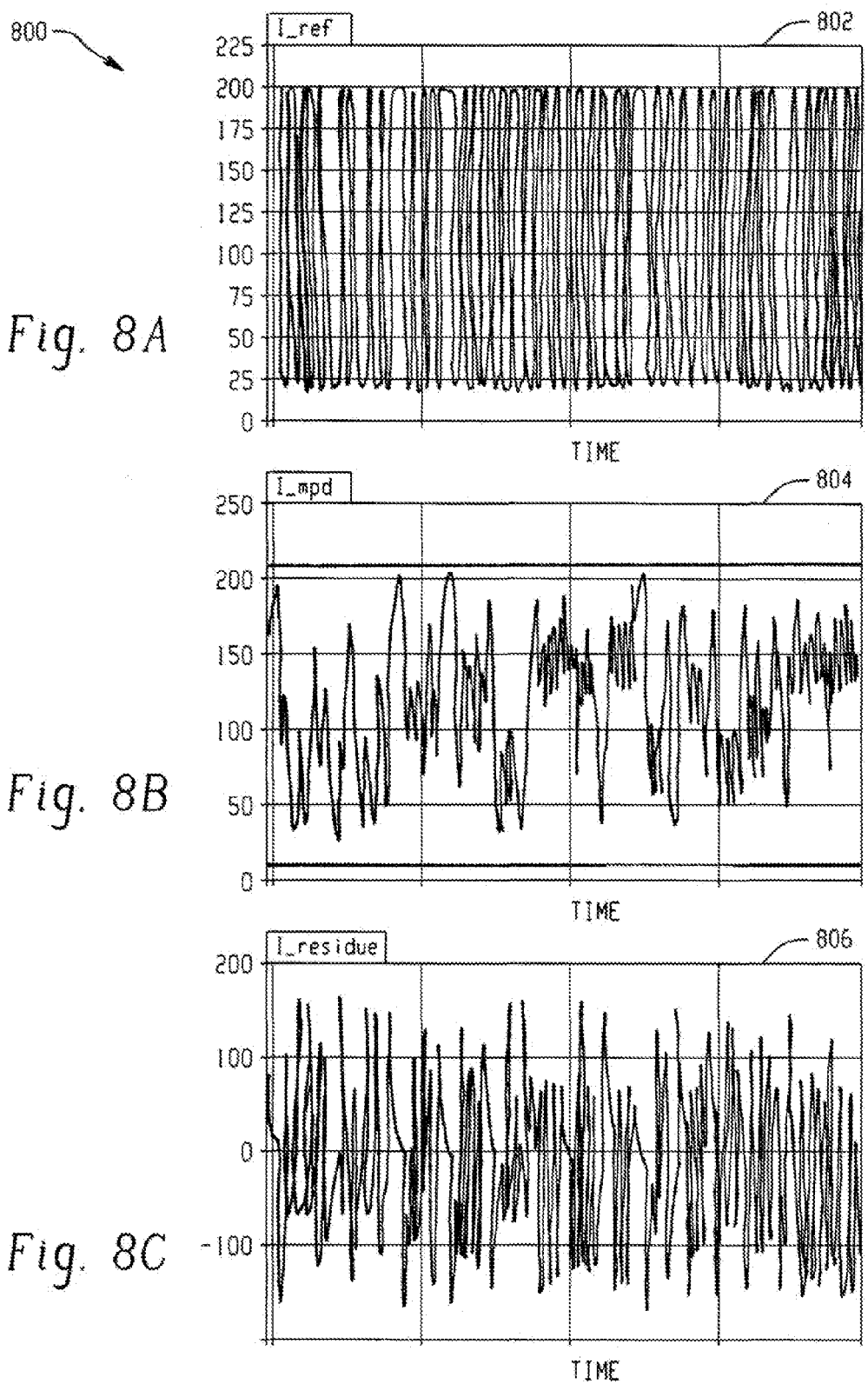
Figure 8D:
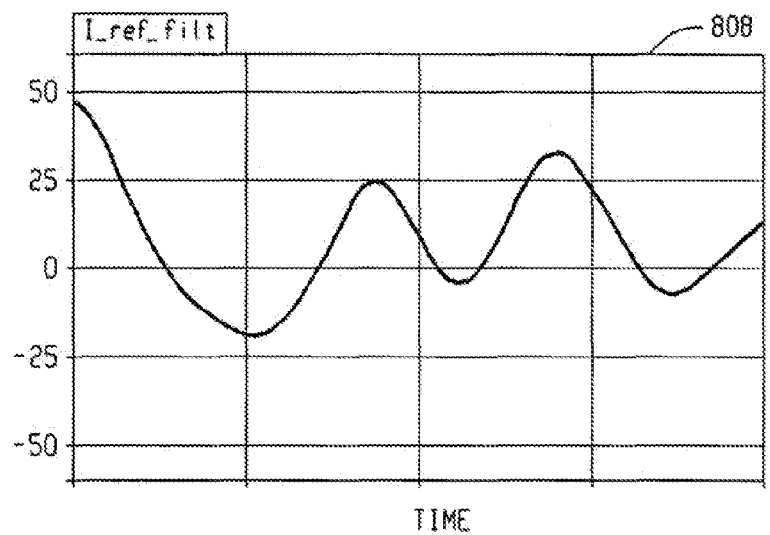
Figure 8E:
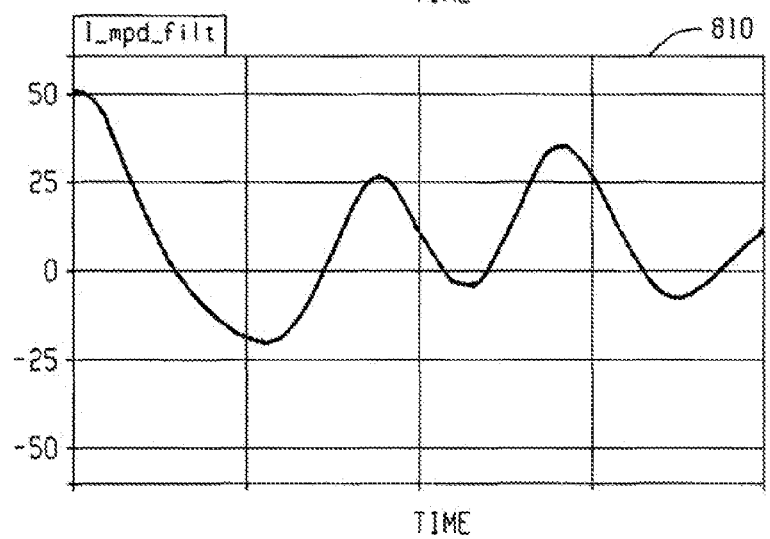
Figure 8F:
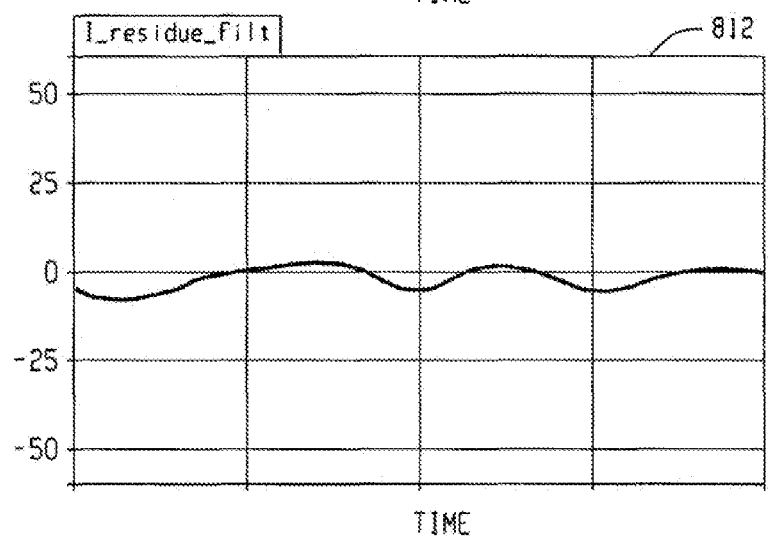
Figure 8G:
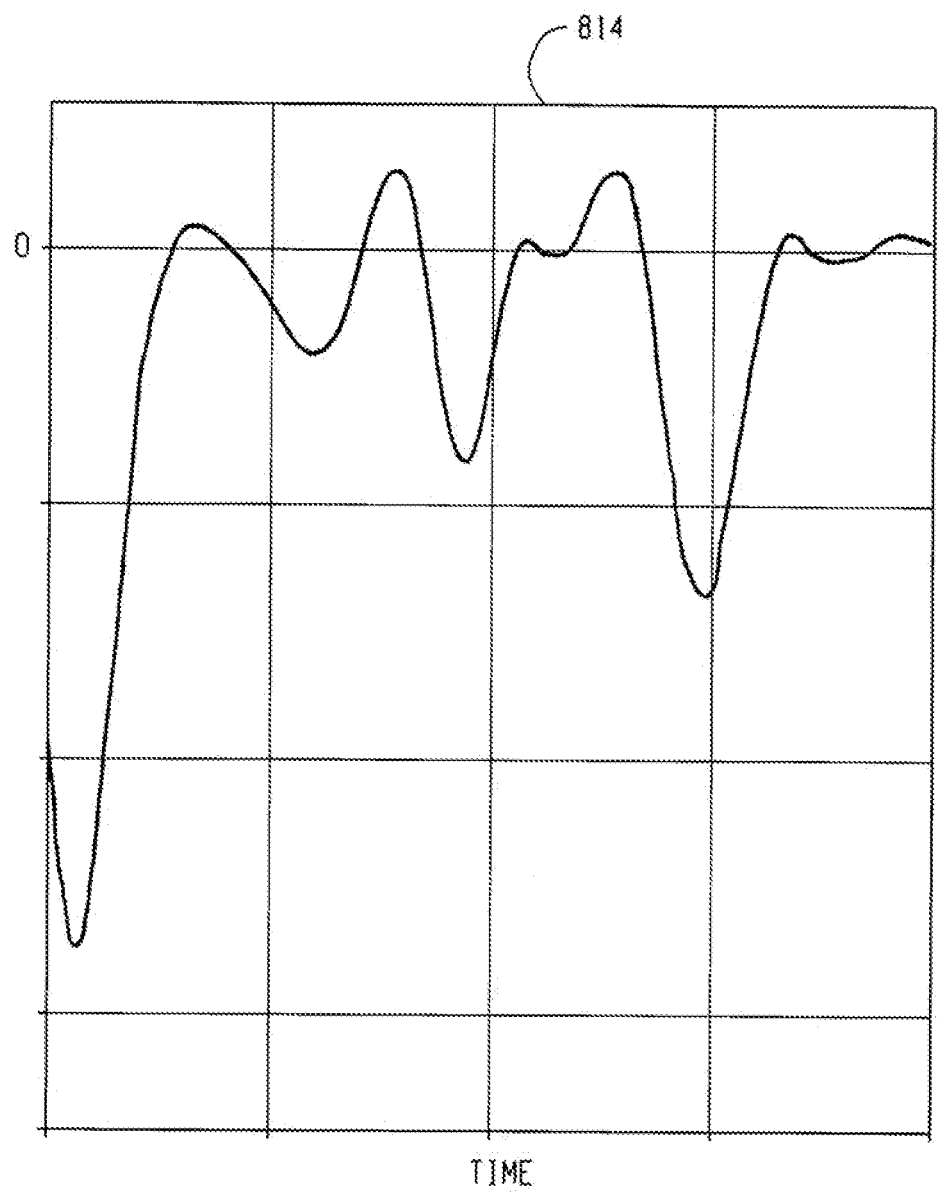

FIG. 6 is a block diagram of an optical modulation feedback circuit depicting example details of a subtractor circuit. A laser diode driver 602 generates a driver signal 604 based on a data input signal 606 and an optical modulation amplitude current feedback signal 608. The driver signal 604 is transmitted to a laser diode 610 for data transmission. A monitor photo diode 612 acts as an optical detector that generates a monitor current signal 614 (example waveform shown in FIG. 7 at 704) that is proportional to an amount of light generated by the laser diode 610, subject to a limited bandwidth $\omega_{MAX}$. A subtractor 616 subtracts a reference current 618 (example waveform shown in FIG. 7 at 702) that is proportional to the data signal 606 from the monitor current signal 614 to generate a residue current 617 (example waveform shown in FIG. 7 at 706). The reference current 618 is generated as a sum of a logic "0" current 620 and a delta current 622, where the logic "1" component of the reference current 618 is controlled by a switch 624 that is responsive to the data signal 606. The logic "0" current 620 and the logic "1" current may be selected such that when the laser diode 612 is transmitting at the desired OMA, the low frequency component of the residue current 617 will be zero.

The residue current 617 is transmitted to a trans-impedance amplifier 626 to convert the residue current 617 to a residue voltage 628. The residue voltage 628 and the data signal 606 are low-pass filtered and AC-coupled at 630, 631 (example waveforms shown in FIG. 7 at 712, 708, respectively), such as according to or below an actual or estimated bandwidth of the monitoring photo diode 612. At 632, the filtered residue signal and filtered data signal are multiplied (example waveform shown in FIG. 7 at 714) and a DC component or average of the multiplication is detected by an integrator 634 to generate the modulation control feedback signal 608 that is transmitted to the laser diode driver 602.

FIGS. 7 and 8 depict a number of plots of example data signals at particular points in the configuration of FIG. 6. In FIG. 7, the OMA of the transmitter is below the target and should be increased accordingly. The plot at 702 represents the $I_{REF}$ signal, which is generated and proportional to the data signal. The $I_{MON0}$ and $N_{MON1}$ magnitudes are selected such that when the optical transmission device is operating at the desired OMA, the low frequency component of the $I_{RESIDUE}$ signal will be zero. The plot at 704 indicates the monitor current signal generated by the monitor photo diode, and the plot at 706 represents the $I_{RESIDUE}$ signal generated by subtracting $I_{REF}$ from $I_{MPD}$. The plots at 708, 710, and 712 represent low pass filtered versions of $I_{REF}$, $I_{MPD}$, and $I_{RESIDUE}$, respectively. At 714, a filtered data signal (e.g., a voltage-form of $I_{REF}$) is multiplied by the filtered residue signal (e.g., a voltage form of $I_{RESIDUE}$) to generate the $V_{MULT}$ signal used to generate the modulation control feedback signal. Because the $V_{MULT}$ signal averages greater than zero, the laser diode driver is instructed to raise the OMA via the data signal proportionally.

In FIG. 8, the OMA of the transmitter is above the target and should be decreased accordingly. The plot at 802 represents the $I_{REF}$ signal, which is generated and proportional to the data signal. The plot at 804 indicates the monitor current signal generated by the monitor photo diode, and the plot at 806 represents the $I_{RESIDUE}$ signal generated by subtracting $I_{REF}$ from $I_{MPD}$. The plots at 808, 810, and 812 represent low pass filtered versions of $I_{REF}$, $I_{MPD}$, and $I_{RESIDUE}$, respectively. At 814, a filtered data signal (e.g., a voltage-form of $I_{REF}$) is multiplied by the filtered residue signal (e.g., a voltage form of $I_{RESIDUE}$) to generate the $V_{MULT}$ signal used to generate the modulation control feedback signal. Because the $V_{MULT}$ signal averages less than zero, the laser diode driver is instructed to lower the OMA via the data signal proportionally.

Figure 9:
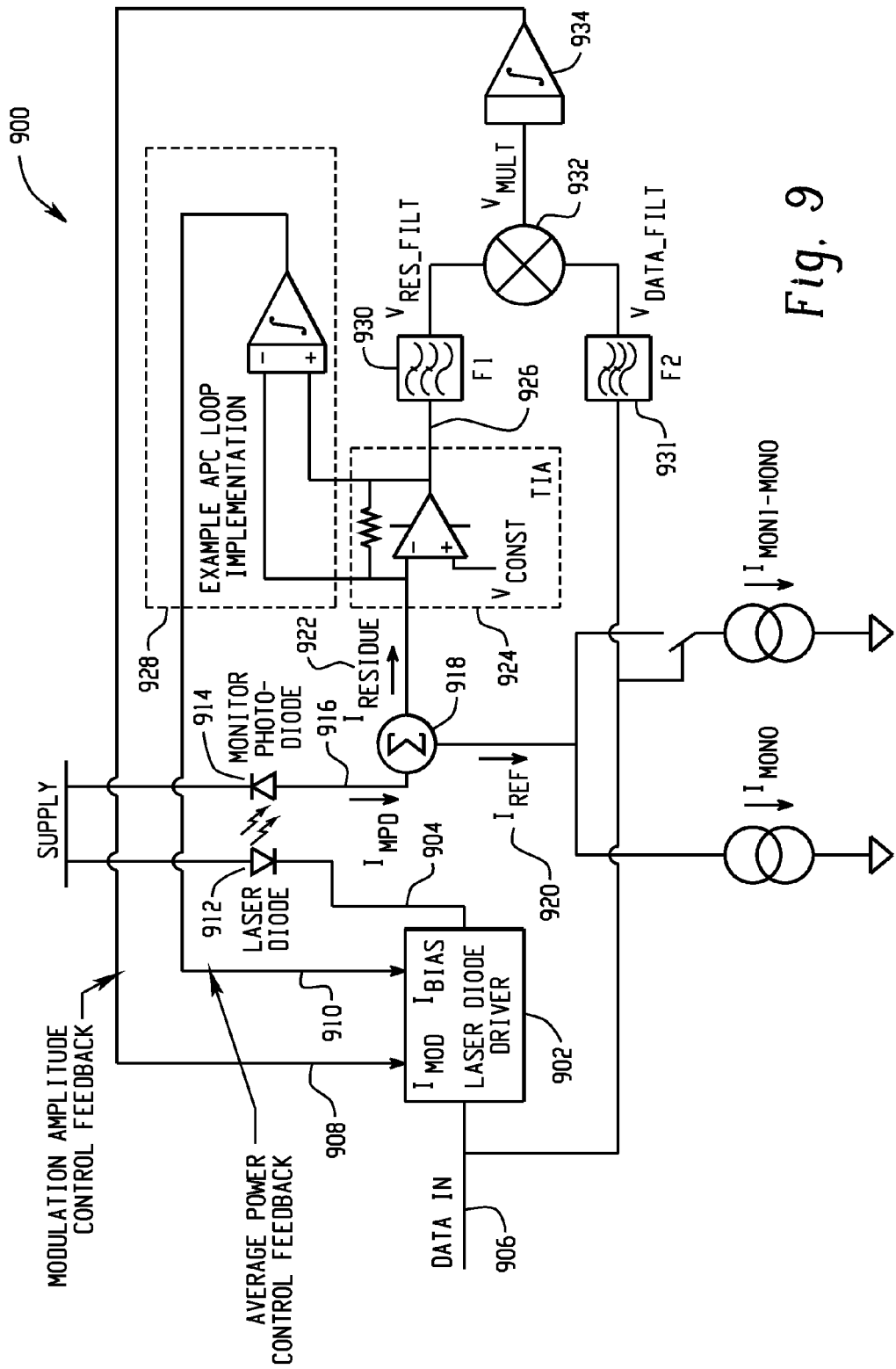
FIG. 9 is a block diagram of an optical modulation feedback circuit including average power control.

In some implementations, it is desirable to also incorporate average power control (APC) feedback into the optical transmitter. FIG. 9 is a block diagram of an example of an optical modulation feedback circuit including average power control. A laser diode driver 902 generates a driver signal 904 based on a data input signal 906, an optical modulation amplitude current feedback signal 908, and an average power control feedback signal 910. The driver signal 904 is transmitted to a laser diode 912 for data transmission. A monitor photo diode 914 acts as an optical detector that generates a monitor current signal 916 that is proportional to an amount of light generated by the laser diode 912. A subtractor 918 subtracts a reference current 920 that is proportional to the data signal 906 from the monitor current signal 916 to generate a residue current 922.

The residue current 922 is transmitted to a trans-impedance amplifier 924 to convert the residue current 922 to a residue voltage 926. The trans-impedance amplifier 924 may filter a DC component from the $I_{RESIDUE}$ signal and provide that DC component to an APC control loop 928. The APC control loop 928 generates the average power control feedback signal 910 based on the DC component of the $I_{RESIDUE}$ signal to force the DC component of the monitor current signal to a desired level. The residue voltage 926 and the data signal 906 are low-pass filtered at 930, 931, such as according to or lower than the actual or estimated bandwidth of the monitoring photo diode 914. At 932, the filtered residue signal and filtered data signal are multiplied or correlated and transmitted to an integrator 934 to generate the modulation control feedback signal 908 that is transmitted to the laser diode driver 902.

Figure 10:
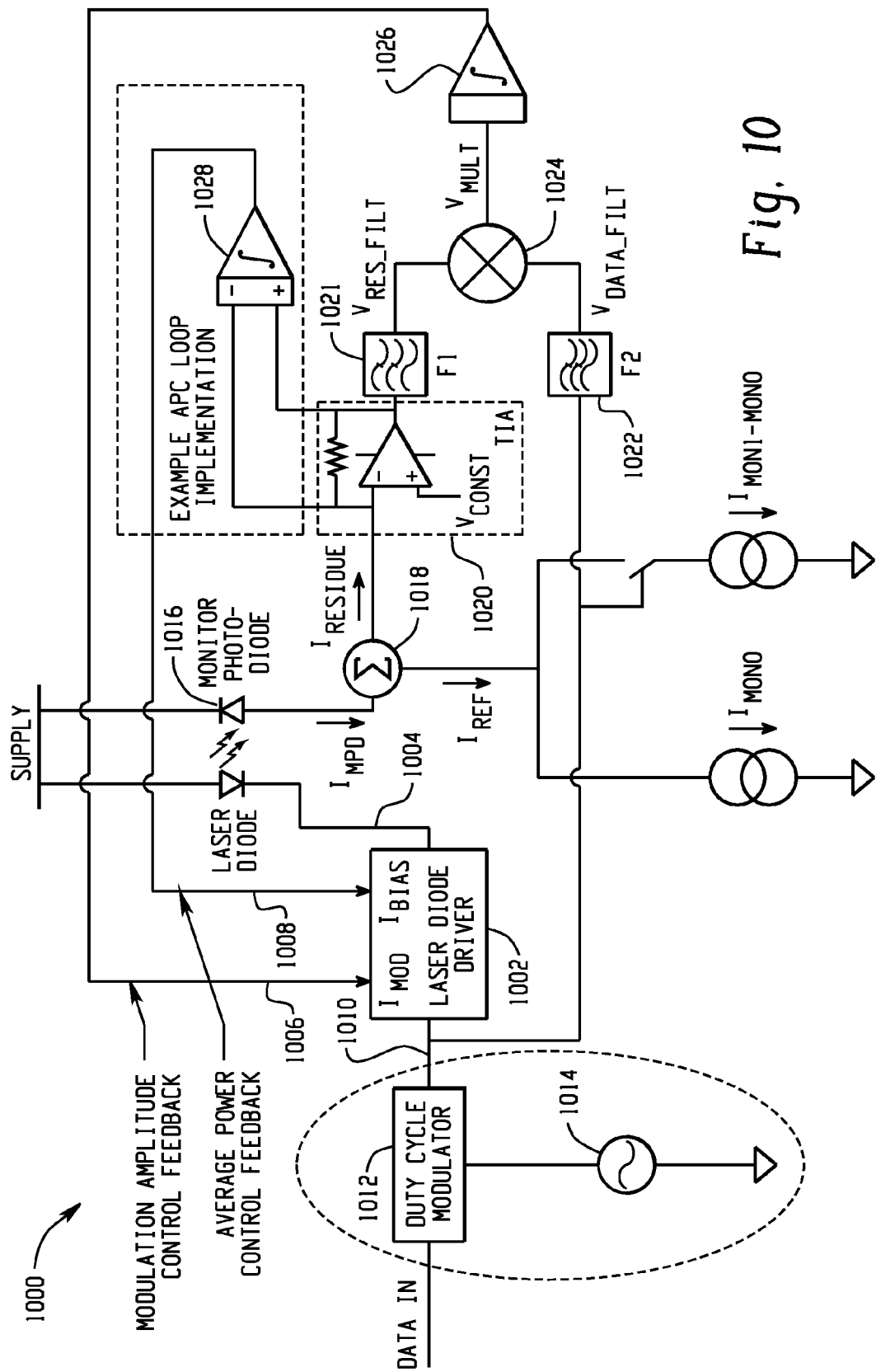
FIG. 10 is a block diagram depicting an optical transmitter that includes a duty cycle modulator.

In some scenarios, such as when the input data is relatively static with a repeating short sequence with a fast repetition rate, the low frequency component of the data signal may be insufficient for identifying deviations of the transmitter OMA from the desired OMA. To ensure a sufficient low frequency component of the data signal, a duty cycle modulator may be incorporated into the optical transmitter. FIG. 10 depicts an optical transmitter that includes a duty cycle modulator. A laser diode driver 1002 transmits a driver signal 1004 based on a modulation amplitude control feedback signal 1006, an average power control feedback signal 1008, and a data input signal 1010 having a duty cycle that is modulated by a duty cycle modulator 1012 according to a low frequency test signal 1014, where the data signal 1010 is produced by differentially delaying the rising and falling edges of the data signal according to the low frequency test signal 1014 (e.g., a pseudo-random bit sequence). The amount of duty cycle distortion introduced by the duty cycle modulator 1012 may be limited such as to have a negligible effect on total jitter of the optical link.

The duty cycle modulated data signal 1010 and a monitor signal from the optical modulator 1016 are provided to a subtractor 1018, trans-impedance amplifier 1020, filters 1021, 1022, multiplier 1024, and integrators 1026, 1028 to generate the modulation amplitude control feedback signal 1006 and average power control feedback signal 1008. Where implementations lacking the duty cycle modulator 1012 may struggle in identifying OMA errors due to a small low frequency component of the input data signal 1010, the configuration of FIG. 10 can provide strong OMA control despite long periods of repetitive data (e.g., an idling pattern such as 10101010 . . . ).

The duty cycle modulation may be selectively activated based on a monitoring of the input data signal. For example, when the data signal is observed to be static (e.g., a repetitive idling pattern), duty cycle modulation may be activated so as to emphasize the low frequency component of the data signal. When the data signal is dynamic, such that a low frequency component is sufficient based on the data signal waveform alone, duty cycle modulation can be disabled.

Figure 11:
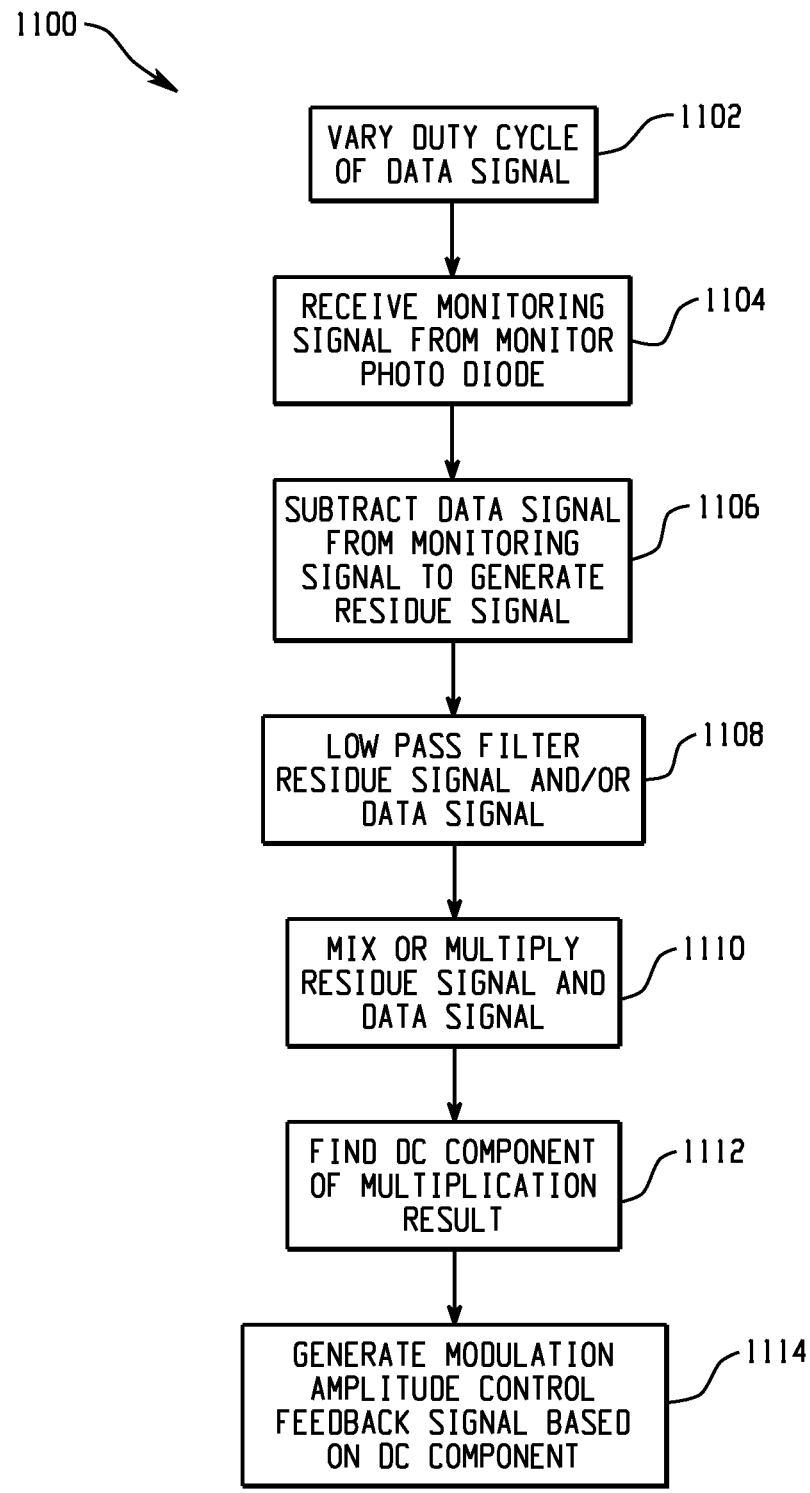
FIG. 11 is a flow diagram depicting a method of performing optical modulation amplitude feedback control including duty cycle modulation.

FIG. 11 is a flow diagram depicting a method of performing optical modulation amplitude feedback control including duty cycle modulation. At 1102, a duty cycle of a received data signal is varied to add to a low frequency component of the data signal. At 1104, a monitoring signal is received from an optical detector that is proportional to an amount of light generated by an optical transmission device that transmits based on the modulated data signal. At 1106, a signal proportional to the modulated data signal is subtracted from the monitoring signal to generate a residue signal. At 1108, one or both of the residue signal and the modulated data signal are low pass filtered, and at 1110, the (filtered) residue signal and data signal are correlated or multiplied to generate a modulation amplitude control feedback signal at 1112.

Figure 12:
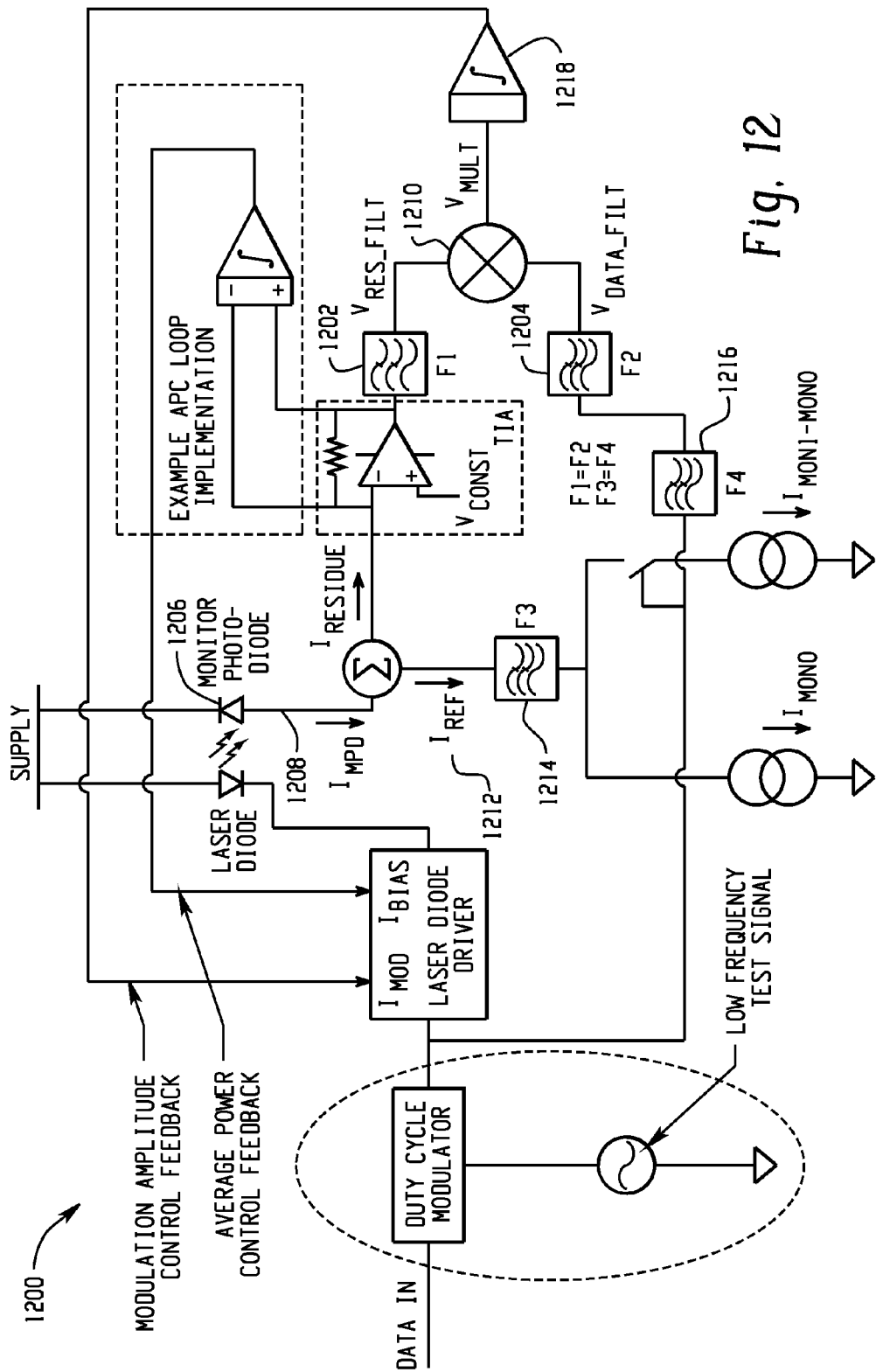
FIG. 12 depicts an example optical transmitter configuration that includes additional filtering of the circuit signals.

The previous configurations are exemplary, and the scope of this disclosure encompasses additional variations not explicitly described above. For example, FIG. 12 depicts an example optical transmitter configuration that includes additional filtering of the circuit signals. In the example of FIG. 12, upper cutoff frequencies of filter F1 1202 and F2 1204 are selected to be lower than the monitoring photo diode 1206 signal to a frequency range that can be accurately detected by the monitor photo diode 1206. Setting excessively high cutoff frequencies at 1202, 1204 can reduce an apparent amplitude of the monitor signal 1208 because the comparison at 1210 includes some frequency components that are attenuated by the monitor photo diode 1206. This apparent attenuation may be exacerbated by an increasing phase shift of the monitor photo diode signal 1208 at frequencies approaching the monitor photo diode 1206 bandwidth limit, reducing a correlation between the data signal and the in-phase component of the monitor photo diode signal 1208.

Filtering the reference signal $I_{REF}$ 1212 prior to subtraction can improve the correlation determination. Low-pass filter F3 1214 compensates to some extent for the limited bandwidth of the monitor photo diode 1206. Filter F4 1216 introduces a matching phase shift to the data signal that is used by the correlator, comprising multiplier 1210 and integrator 1218. When F3 1214 matches the frequency response of the monitor photo diode 1206, then $I_{RESIDUE}$ will be zero when OMA is on target. While the monitor photo diode 1206 bandwidth is typically not known with great accuracy, the inclusion of filters F3 1214 and F4 1216 allows the system to tolerate a wider range of monitor photo diode 1206 bandwidth while maintaining accuracy of amplitude control.

For example, if monitor photo diode 1206 bandwidth is higher than F3 1212 bandwidth, then the amplitude of the monitor photo diode signal 1208 will exceed that of the reference signal at frequencies approaching F3 1214 bandwidth. This might be expected to cause the system to overestimate the current OMA. However, at such frequencies, there is also increasing phase difference between the monitoring signal 1208 and the reference signal 1212, due to the increasing phase shift introduced by filter F3 1212. This, again, reduces the correlation between the (similarly filtered) data signal and the in-phase component of the monitor photo diode signal 1208. Therefore, the phase difference tends to compensate, to some extent, for the amplitude difference. This is in contrast to the other situations, where the phase difference may reinforce the amplitude difference.

Therefore, F3 1214 can be set quite aggressively to compensate for a low monitor photo diode 1206 bandwidth, without significantly affecting the accuracy if the monitor photo diode 1206 bandwidth is higher than expected. For a given bandwidth of F1 1202 and F2 1204 (which set the bandwidth of the amplitude comparison), the system can tolerate a much wider range of monitor photo diode 1206 bandwidths; and/or for a given lower limit of monitor photo diode 1206 bandwidth, the bandwidth of F1 1202 and F2 1204 can be increased, allowing the amplitude comparison to be made over a wider frequency band. The latter allows a much greater proportion of the data signal energy to be used in the comparison. This reduces sensitivity to noise and offsets and allows the detection of OMA error to be made over a much shorter time window. This may be useful for burst mode optical drivers, where data may be transmitted in short bursts.

Figure 13:
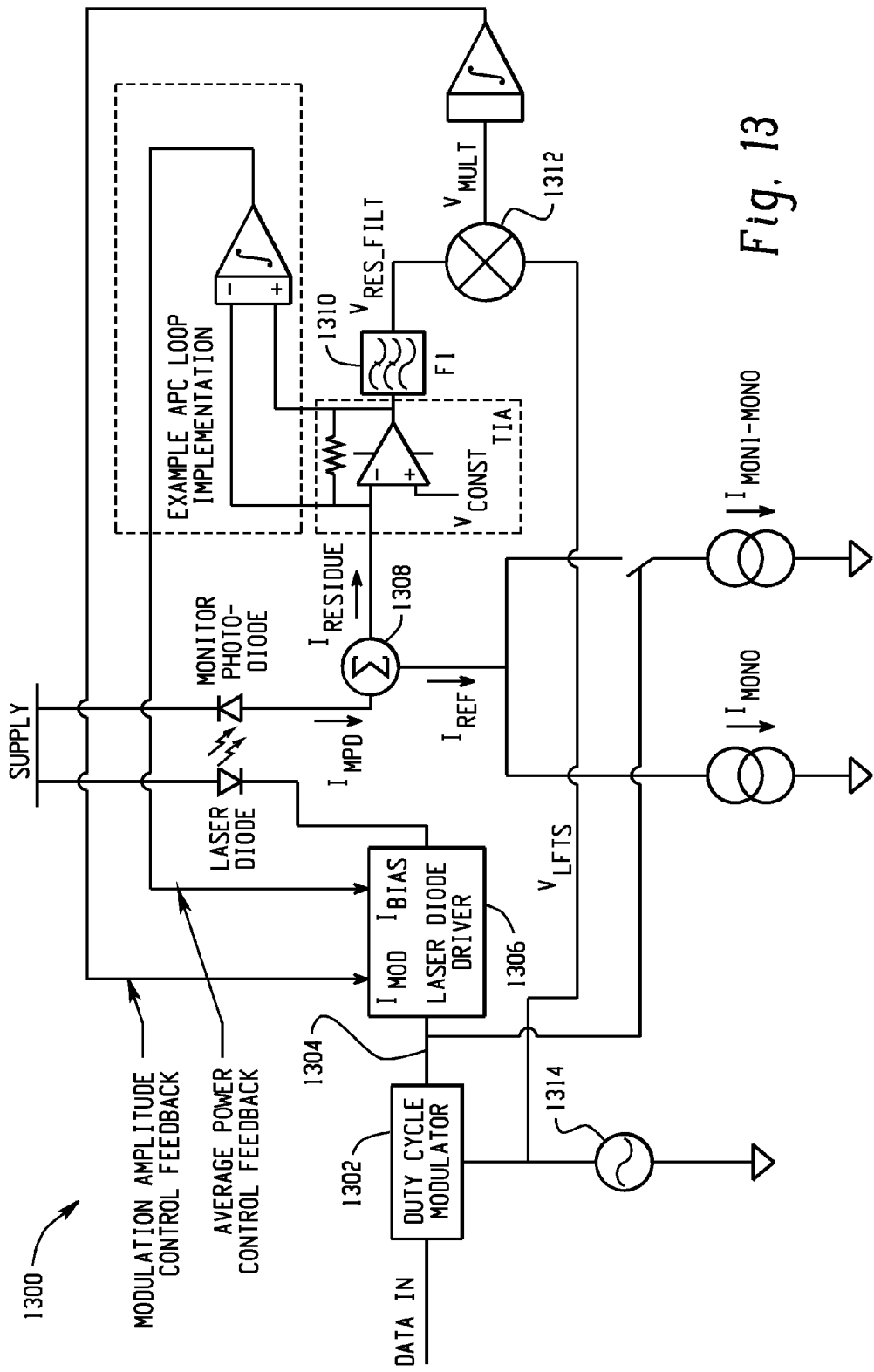
FIG. 13 is a block diagram depicting an alternate data signal duty cycle modulation configuration.
Figure 14:
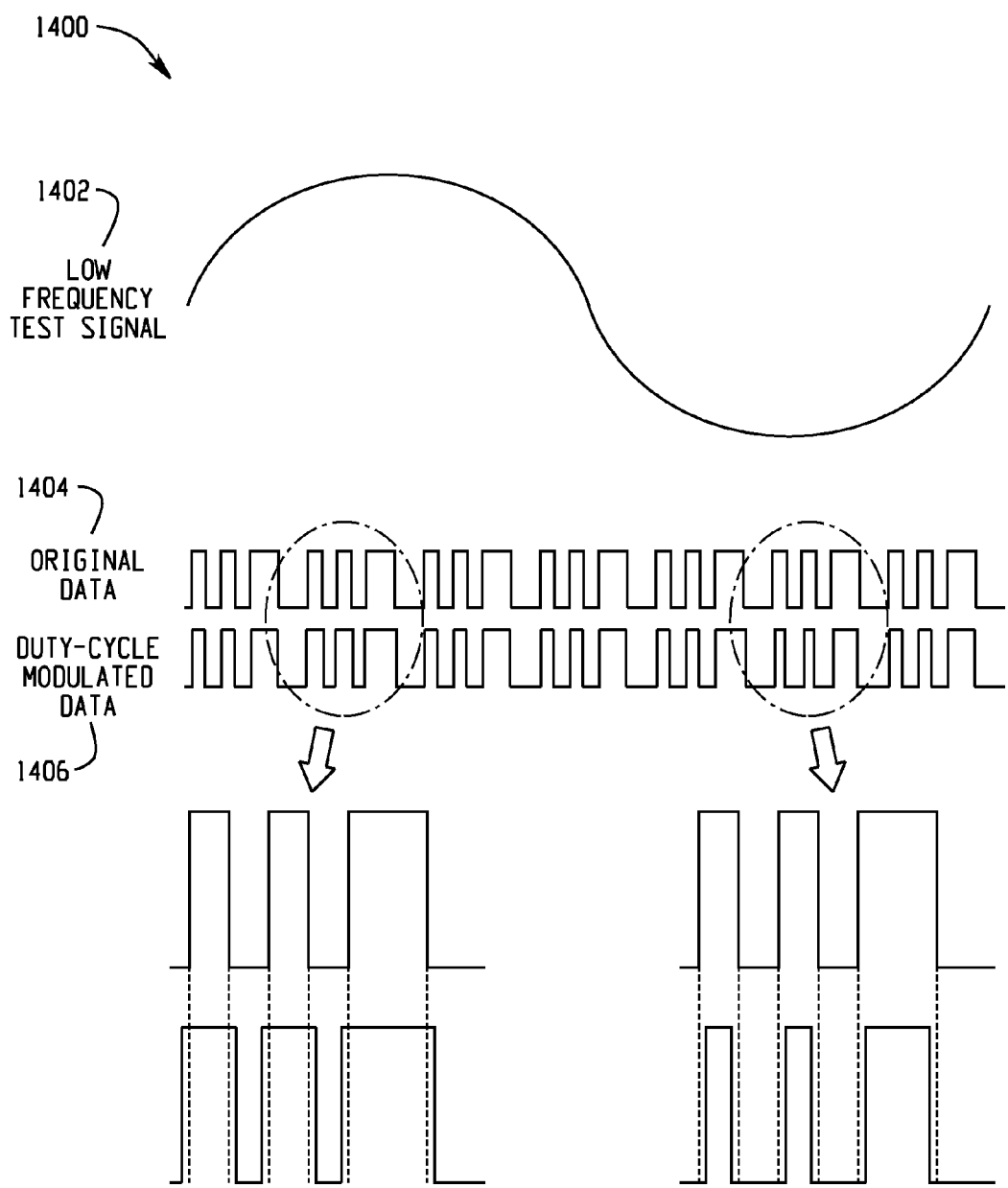
FIG. 14 depicts an example low frequency test signal and the effect of that test signal on the data signals.

As another example, FIG. 13 is a block diagram depicting an alternate data signal duty cycle modulation configuration. A duty cycle modulator 1302 varies the duty cycle of an input data signal to generate a modulated input data signal 1304 that is transmitted to the laser diode driver 1306. Unlike previously described examples, instead of providing the data signal 1304 to the multiplier/mixer 1312, the low frequency test signal 1314 is instead provided as the input to 1312. In scenarios where a large portion of the low frequency component of the data signal 1304 is provided by the duty cycle modulation, direct usage of the low frequency test signal 1314 can provide improved OMA control. FIG. 14 depicts an example low frequency test signal 1402 and the effect of that test signal on the data signals 1404.

Figure 15:
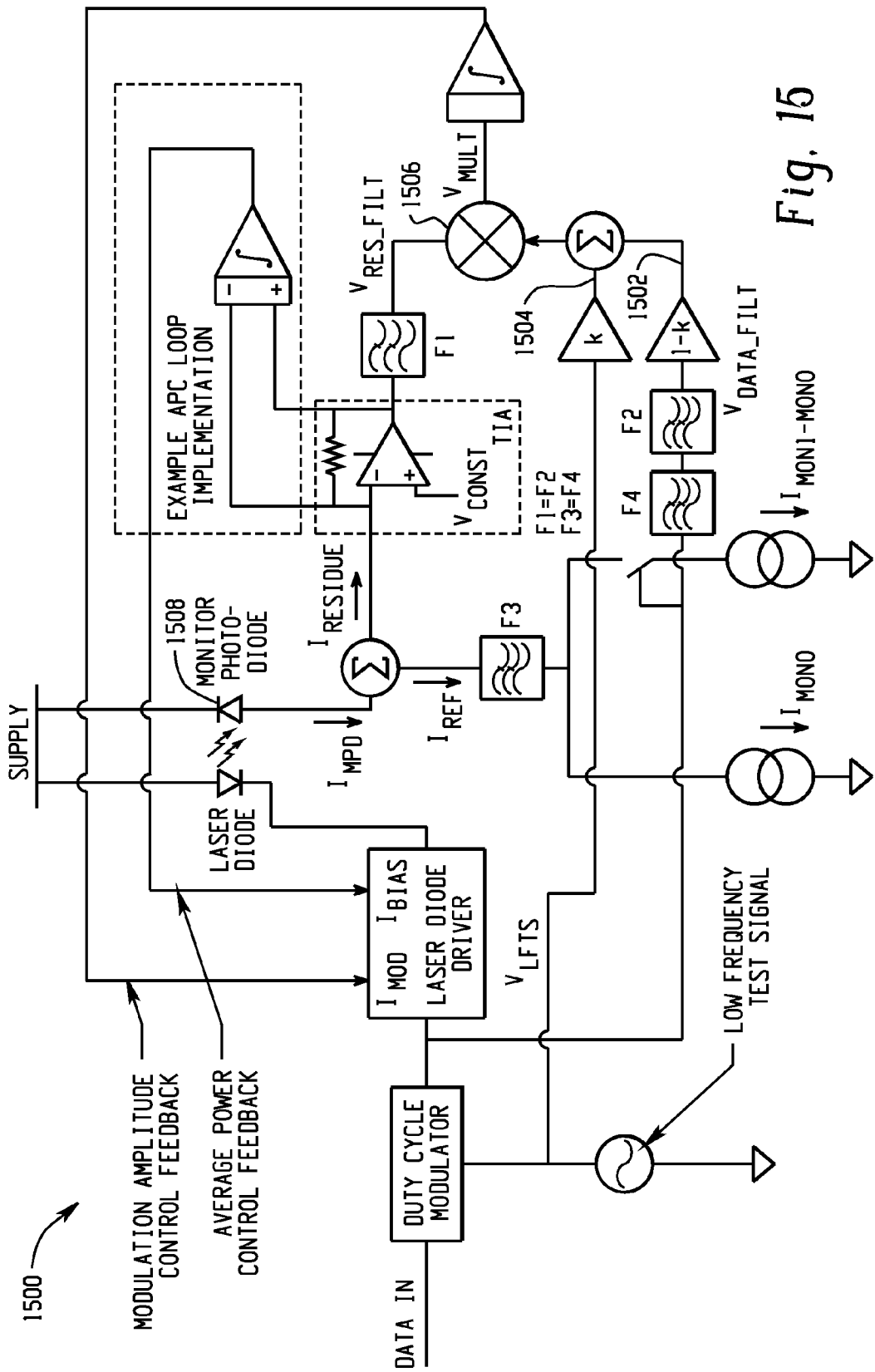
FIG. 15 depicts a hybrid architecture.

As a further example, FIG. 15 depicts a hybrid architecture. The hybrid architecture combines certain features described herein above. In the example of FIG. 15, both VDATA_FILT 1502 and VLFTS 1504 are provided to the correlator 1506. The architecture of FIG. 15 may provide quality OMA control that is irrespective of the amount of low-frequency content in the input data signal.

Certain of the embodiments described herein can provide excellent immunity to non-linearity, kinks, and bumps in the L-I curve and may avoid any necessity for detailed characterization of the laser. The depicted architecture may be implemented with a moderate or low bandwidth monitor photodiode, may exhibit low power consumption, and may be utilized in systems having very high (theoretically unlimited) bit rates.

It is noted that the optical modulation amplitude control systems can be provided in a variety of configurations. For example, an optical modulation feedback circuit can be implemented in a standalone fashion that includes a low frequency comparison circuit that generates a modulation control feedback signal. In another configuration, an optical driver integrated circuit can include an optical driver and a low frequency comparison circuit. In a further configuration, an optical module can include an optical driver, a laser diode, an optical detector, and a low frequency comparison circuit. Additionally, certain elements may use digital components instead of the analog versions depicted herein.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

For example, the systems and methods may utilize data signals conveyed via networks (e.g., local area network, wide area network, internet, combinations thereof, etc.), fiber optic medium, modulated carrier waves, wireless networks, etc. for communication with one or more data processing devices. The data signals can carry any or all of the data disclosed herein that is provided to or from a device.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Additionally, use of the term "each" does not necessarily mean "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. An optical modulation feedback circuit, comprising:
a low frequency comparison circuit configured to:
receive a monitoring signal generated by an optical detector, the monitoring signal being proportional to an amount of light generated by an optical transmission device that transmits based on a data signal that is received by an optical driver; and
generate a modulation control feedback signal that is transmitted to the optical driver based on a comparison of a low frequency component of the monitoring signal and a low frequency component of the data signal;
wherein a duty cycle of the data signal is varied according to a low frequency test signal to add to the low frequency component of the data signal; and
wherein the comparison circuit is configured to subtract a signal proportional to the data signal from the monitoring signal to generate a residue signal, wherein the modulation control feedback signal is generated based on a multiplication or correlation of the residue signal and the low frequency test signal.

2. The circuit of claim 1, further comprising a low pass filter, wherein the residue signal is transmitted to the low pass filter prior to generation of the modulation control feedback signal.

3. The circuit of claim 1, wherein a bandwidth of the low frequency component of the data signal is lower than a bandwidth of the optical detector.

4. The circuit of claim 1, wherein the modulation control feedback signal is transmitted to the optical driver to adjust a modulation amplitude of the optical driver.

5. The circuit of claim 1, wherein a low frequency component of the residue signal is zero when a desired optical modulation amplitude of the optical transmission device is achieved.

6. The circuit of claim 1, further comprising an integrator or low pass filter, wherein the integrator or low pass filter is configured to receive the multiplication or correlation of the residue signal and the data signal and to generate the modulation control feedback signal.

7. The circuit of claim 1, further comprising an average power control circuit configured to transmit an average power control feedback signal to the optical driver based on a DC component of the monitoring signal.

8. The circuit of claim 1, wherein the low frequency comparison circuit is configured to subtract a DC component from the monitoring signal or the residue signal.

9. The circuit of claim 1, wherein the optical transmission device is an LED, a laser diode, or a VCSEL.

10. A method of performing optical modulation amplitude feedback control, comprising:
receiving a monitoring signal from an optical detector that is proportional to an amount of light generated by an optical transmission device that transmits based on a data signal that is received by an optical driver;
varying a duty cycle of the data signal according to a low frequency test signal to add to a low frequency component of the data signal;
generating a modulation control feedback signal that is transmitted to the optical driver based on a comparison of a low frequency component of the monitoring signal and the low frequency component of the data signal;
wherein a signal proportional to the data signal is subtracted from the monitoring signal to generate a residue signal, wherein the modulation control feedback signal is generated based on a multiplication or correlation of the residue signal and the low frequency test signal.

11. The method of claim 10, wherein a low frequency component of the residue signal is zero when a desired optical modulation amplitude of the optical transmission device is achieved.

12. An optical driver integrated circuit, comprising:
an optical driver configured to output a driver signal based on a received data signal, wherein a modulation amplitude of the driver signal is controlled according to a received modulation control feedback signal;
a low frequency comparison circuit configured to:
receive a monitoring signal generated by an optical detector, the monitoring signal being proportional to an amount of light generated by an optical transmission device that transmits based on the driver signal; and
generate the modulation control feedback signal that is transmitted to the optical driver based on a comparison of a low frequency component of the monitoring signal and a low frequency component of the data signal;
wherein a duty cycle of the data signal is varied according to a low frequency test signal to add to the low frequency component of the data signal; and
wherein the comparison circuit is configured to subtract a signal proportional to the data signal from the monitoring signal to generate a residue signal, wherein the modulation control feedback signal is generated based on a multiplication or correlation of the residue signal and the low frequency test signal.

13. An optical module, comprising:
an optical driver configured to output a driver signal based on a received data signal, wherein a modulation amplitude of the driver signal is controlled according to a received modulation control feedback signal;
a laser diode configured to transmit light based on the driver signal;
an optical detector configured to generate a monitoring signal that is proportional to an amount of light generated by the optical transmission device; and
a low frequency comparison circuit configured to generate the modulation control feedback signal that is transmitted to the optical driver based on a comparison of a low frequency component of the monitoring signal and a low frequency component of the data signal;
wherein a duty cycle of the data signal is varied according to a low frequency test signal to add to the low frequency component of the data signal;
wherein the comparison circuit is configured to subtract a signal proportional to the data signal from the monitoring signal to generate a residue signal, wherein the modulation control feedback signal is generated based on a multiplication or correlation of the residue signal and the low frequency test signal.

* * * * *